(12) United States Patent
Lu et al.

(10) Patent No.: US 9,959,207 B2
(45) Date of Patent: May 1, 2018

(54) LOG-STRUCTURED B-TREE FOR HANDLING RANDOM WRITES

(71) Applicant: VMware, Inc., Palo Alto, CA (US)

(72) Inventors: Yunshan Lu, San Jose, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 207 days.

(21) Appl. No.: 14/750,554

(22) Filed: Jun. 25, 2015

(65) Prior Publication Data

US 2016/0378653 A1    Dec. 29, 2016

(51) Int. Cl.
  *G06F 12/08* (2016.01)
  *G06F 12/0806* (2016.01)
  *G06F 12/0866* (2016.01)

(52) U.S. Cl.
  CPC ...... *G06F 12/0806* (2013.01); *G06F 12/0866* (2013.01); *G06F 2212/463* (2013.01); *G06F 2212/621* (2013.01)

(58) Field of Classification Search
  None
  See application file for complete search history.

(56) References Cited

U.S. PATENT DOCUMENTS

| | | | | |
|---|---|---|---|---|
| 8,683,262 B1 * | 3/2014 | Subbiah | ............ | G06F 11/1471 |
| | | | | 714/16 |
| 2015/0019792 A1 * | 1/2015 | Swanson | ................ | G06F 9/466 |
| | | | | 711/102 |

* cited by examiner

*Primary Examiner* — Gary W. Cygiel
(74) *Attorney, Agent, or Firm* — Patterson & Sheridan LLP

(57) ABSTRACT

A sorted key-value store is implemented using a write-back cache maintained in memory, a B-tree data structured maintained in disk, and a logical and physical log for providing transactions. The logical log and write-back cache are used to answer client requests, while dirty blocks in the write-back cache are periodically flushed to disk using the physical log.

20 Claims, 4 Drawing Sheets

LOG-STRUCTURED B-TREE FOR HANDLING RANDOM WRITES

BACKGROUND

Data stored in a storage device is often accessible using a block device interface. The data is typically visible and accessible to any client with access to the storage device. Operating systems or other storage clients can erase data from the storage device, format the storage device, and otherwise manipulate and change the data.

Storage systems often use transactions to implement atomic updates of on-disk data structures. For example, an update operation on a bitmap data structure to indicate certain blocks are now allocated and a write operation of the underlying blocks are performed atomically to ensure consistency of the storage system. Otherwise, should the storage system crash or fail mid-operation, the storage system (specifically the bitmap and underlying data blocks) would be left in an inconsistent state. Database systems have typically used data structures such as log-structured merge trees (LSM) having performance characteristics that make the data structure attractive for providing indexed access to files with high insert volume. However, because of their performance for read operations, such LSM data structures have been generally not been adapted for use in file systems and other storage systems particular in cases when read performance is important.

DETAILED DESCRIPTION

Figure 1:
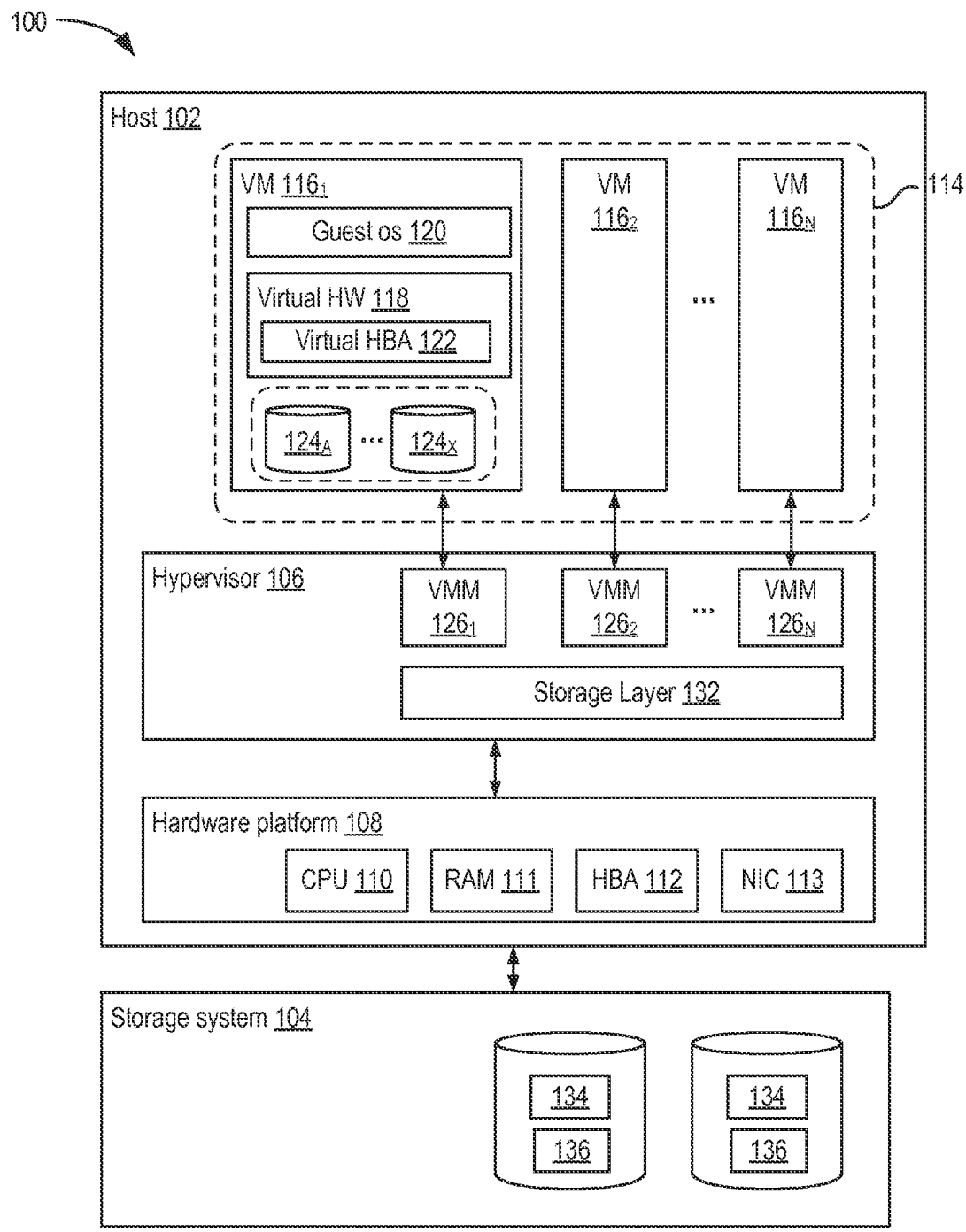
FIG. 1 is a block diagram that illustrates a computer system in which one or more embodiments may be utilized.

FIG. 1 is a block diagram that illustrates a computer system 100 according to one or more embodiments of the present disclosure. Computer system 100 includes one or more hosts 102 configured to provide a virtualization layer that abstracts processor, memory, storage, and networking resources of a hardware platform 108 into multiple virtual machines (VMs) 116 that run concurrently on the same host 102. VMs 116 run on top of a software interface layer, referred to as a hypervisor 106, that enables sharing of the hardware resources of host 102 by VMs 116. One example of hypervisor 106 is a VMware ESXi hypervisor provided as part of the VMware vSphere solution made commercially available from VMware, Inc. In some embodiments, storage system 104 may be implemented as software-define storage such as VMware Virtual SAN that clusters together server-attached hard disks and/or solid state drives (HDDs and/or SSDs), to create a flash-optimized, highly resilient shared datastore designed for virtual environments.

Host 102 may comprise a general purpose computer system having one or more virtual machines accessing data stored on a storage system 104 communicatively connected to host 102. Host 102 may be constructed on a conventional, typically server-class, hardware platform 108. Hardware platform 108 of host 102 may include conventional physical components of a computing device, such as a processor (CPU) 110, a memory 111, a disk interface 112, and a network interface card (NIC) 113. Processor 110 is configured to execute instructions, for example, executable instructions that perform one or more operations described herein and may be stored in memory 111. Memory 111 and storage system 104 are devices allowing information, such as executable instructions, cryptographic keys, virtual disks, configurations, and other data, to be stored and retrieved. Memory 111 may include, for example, one or more random access memory (RAM) modules. Storage system 104 may include one or more locally attached storage devices, for example, one or more hard disks, flash memory modules, solid state disks, and optical disks. In some embodiments, storage system 104 may include a shared storage system having one or more storage arrays of any type such as a network-attached storage (NAS) or a block-based device over a storage area network (SAN). Disk interface 112, such as a host bus adapter (HBA), enables host 102 to communicate with a storage device, such as storage system 104, to store "virtual disks" that are accessed by VMs 116, as described later. Network interface 113 enables host 102 to communicate with another device via a communication medium, such as a communication network (not shown). An example of network interface 113 is a network adapter, also referred to as a Network Interface Card (NIC).

While storage system 104 is typically made up of a plurality of disks, other forms of storage, such as solid-state non-volatile storage devices, may be used, and the use of the term, "disk" herein, should therefore not be construed as limited only to rotating disk storage media, but may also be construed to encompass solid state disks, or "SSDs." In some embodiments, storage system 104 may be comprised of high-density non-volatile memory. Furthermore, while storage system 104 is depicted as a separate, external component to host 102, storage system 104 may be internal to host 102, for example, a local storage device or locally attached storage.

As shown in FIG. 1, a hypervisor 106 is installed on top of hardware platform 108 and supports a virtual machine execution space 114 within which multiple virtual machines (VMs) $116_1$-$116_N$ may be instantiated and executed. Each such virtual machine $116_1$-$116_N$ implements a virtual hardware platform 118 that supports the installation of a guest operating system (OS) 120 which is capable of executing one or more applications (not shown). Examples of a guest OS 120 include any of the well-known commodity operating systems, such as Microsoft Windows, Linux, and the like. In each instance, guest OS 120 includes a native file system layer, for example, either an NTFS or an ext3 type file system layer. These file system layers interface with virtual hardware platforms 118 to access, from the perspective of guest operating systems 120, a data storage HBA, which in reality, is virtual HBA 122 implemented by virtual hardware platform 118 that provides the appearance of disk storage support (in reality, virtual disks $124_A$-$124_X$) to enable execution of guest OS 120 transparent to the virtualization of the system hardware. A virtual disk 124 exposes the same abstraction as a real (physical) disk, that is, a linear list of sectors; however, a VMM may choose to implement virtual disks 124 as regular files on the host. Although, from the perspective of guest operating systems 120, file system calls initiated by such guest operating systems 120 to implement file system-related data transfer and control operations appear to be routed to virtual disks $124_A$-$124_X$ for final execution, in reality, such calls are processed and passed through virtual HBA 122 to adjunct virtual machine monitor (VMM) layers $126_1$-$126_N$ that implement the virtual system support needed to coordinate operation with hypervisor 106. In particular, a HBA emulator of each VMM 126 functionally enables the data transfer and control operations to be correctly handled by hypervisor 106 which ultimately passes such operations through its various layers to true hardware HBAs 112 or NIC 113 that connect to storage system 104.

Hypervisor 106 includes a storage layer 132 configured to manage storage space persistently for VMs 116 via VMM layers $126_1$ to $126_N$. In one embodiment, storage layer 132 may include numerous logical layers, such as an I/O virtualization layer, a file system driver, and a disk access layer. In some embodiments, the I/O virtualization layer receives a data transfer and control operation (in the form of I/O commands, for example, intended for a virtual disk) from VMM layers $126_1$ to $126_N$, and converts the operations into file system operations that are understood by a virtual machine file system (VMFS) driver in order to access a file stored in underlying storage under the management of the VMFS driver that represents virtual disk 124. The I/O virtualization layer then issues these file system operations to the VMFS driver. The VMFS driver, in general, manages creation, use, and deletion of files (e.g., such as .vmdk files representing virtual disks) stored on physical locations of, or in logical volumes or Logical Unit Numbers (LUNs) exposed by, storage system 104. The VMFS driver converts the file system operations received from the I/O virtualization layer to raw SCSI operations, which are issued to a data access layer that applies command queuing and scheduling policies to the raw SCSI operations and ultimately sends the raw SCSI operations to components of physical hardware platform 108. While storage layer 132 is depicted as part of a virtualized architecture, it should be recognized that embodiments of the present disclosure can be extended to other systems having a storage layer. For example, in an alternative embodiment, storage layer 132 may be a file system driver of an operating system that manages storage space persistently for locally attached storage.

It should be recognized that the various terms, layers and categorizations used to describe the virtualization components in FIG. 1 may be referred to differently without departing from their functionality or the spirit or scope of the invention. For example, VMMs 126 may be considered separate virtualization components between VMs 116 and hypervisor 106 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 118 may be merged with and into VMM 126 such that virtual host bus adapter 122 is removed from FIG. 1 (i.e., since its functionality is effectuated by a host bus adapter emulator within VMM 126).

Storage layer 132 maintains on-disk storage metadata 134 for facilitating the dynamic allocation of storage blocks 136 (sometimes referred to as disk blocks, disk sectors, or sectors) and other operations on storage system 104. For example, storage layer 132 is configured to receive and/or execute space allocation requests for storage blocks 136 that can used to handle requests to write data to storage system 104. In some embodiments, storage layer 132 uses storage metadata 134 for such tasks as remembering which storage blocks 136 are allocated and which storage blocks are free (e.g., bitmaps), or allowing quick random access to an arbitrary block in a particular file (e.g., B-trees).

Figure 2:
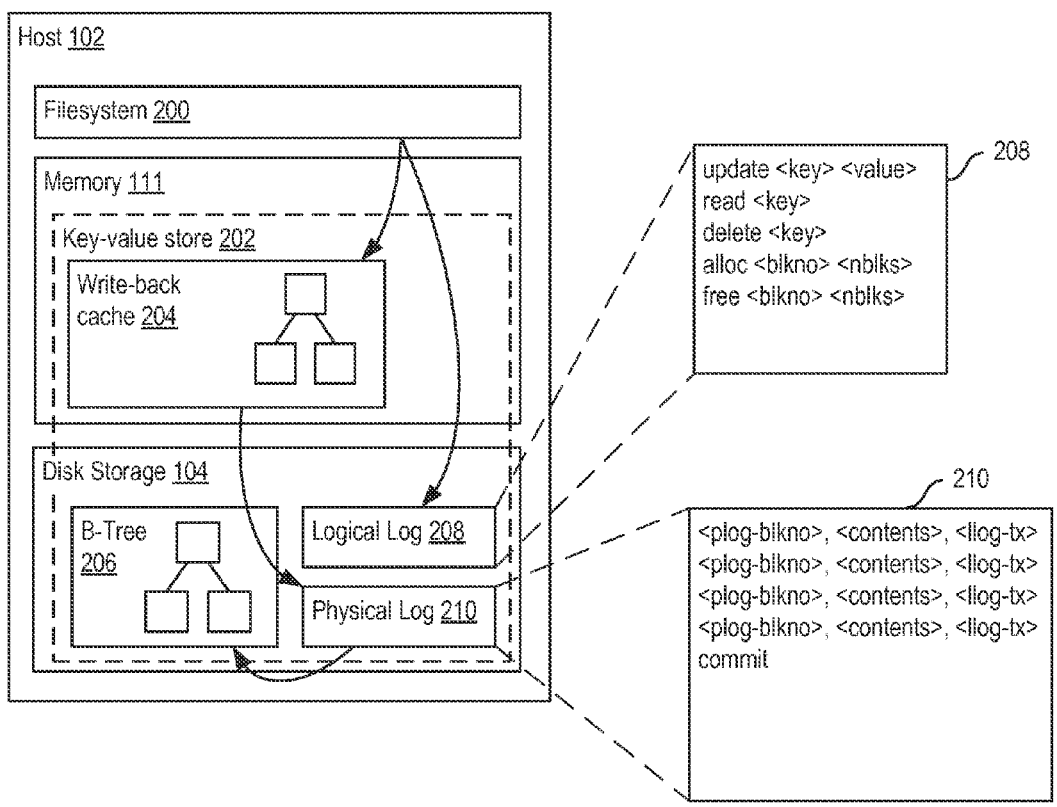
FIG. 2 is a block diagram depicting a file system maintaining data structures for processing file operations, according to one embodiment of the present disclosure.

FIG. 2 is a block diagram depicting a file system 200 maintaining data structures for processing file operations, according to one embodiment of the present disclosure. A host 102 includes a file system 200 that controls how data within storage system 104 is stored and retrieved. File system 200 may be storage layer 132 described in conjunction with FIG. 1, or in other embodiments, may be any file system or storage subsystem.

In one embodiment, file system 200 manages a sorted, key-value store 202 for persistently writing and reading data. Key-value store 202 is configured to insert key-value pairs, and in response to requests providing a particular key, quickly retrieve the data value associated with that key (or otherwise indicate no value is found). Key-value store 202 is further configured to be able to retrieve data values in an iterative fashion (i.e., sorted).

While one approach for implementing a sorted key-value store is to use a log-structured merge tree, log-structured merge trees can be difficult and complex to implement. Furthermore, log-structured merge trees may suffer from poor performance when performing random read operations, particularly in situations where the log-structured merge tree has to perform seeks on multiple levels of the merge tree. As such, log-structured merge trees may be considered inappropriate for use with file systems (in which read and lookup operations are frequent and routine).

Accordingly, in one or more embodiments, file system 200 maintains a plurality of data structures to implement a sorted key-value store 202 which is optimized for random writes, has faster read performance than a log-structured merge tree, and is easier to implement than a log-structured merge tree. In one embodiment, file system 200 includes a write-back cache 204 maintained in memory 111, a B-tree data structure 206 maintained in storage 104, a logical log 208, and a physical log 210. B-tree data structure 206 is configured to permit quick random access to an arbitrary block in a particular file stored in storage 104. While embodiments of the present disclosure are discussed in terms of a B-tree data structure, it is understood that variations of the B-tree data structure may be used, including B+ trees, red-black trees, and other tree-like data structures.

In one embodiment, file system 200 uses logical log 208 and write-back cache 204 to quickly fulfill file system client requests. File system 200 may write operations to logical log 208 as intentions to operate on data in storage 104. Logical log 208 and physical log 210 enable file system 200 to use transactions for atomic updates of on-disk data (e.g., B-tree data structure 206). In some embodiments, entries in logical log 208 include an operation specifying a particular I/O command, and one or more arguments specifying information needed to perform the I/O command. Example entries in logical log 208 are depicted in FIG. 2. For example, logical log 208 contains a first entry containing an update operation for a <value> at an address <key>, a second entry containing a read operation for data found at an address <key>, a third entry containing an operation to delete data found at an address <key>, and entries containing a space allocation (e.g., "alloc") or de-allocation (e.g., "free") operation for data blocks. In some embodiments, each entry may have a transaction identifier.

In one embodiment, physical log 210 contains a physical representation of the blocks on disk (e.g., data). In contrast to logical log 208, physical log 210 has the property of idempotency such that operations in physical log 210 may be replayed repeatedly without changing the result beyond the intended state. Example entries in physical log 210 are depicted in FIG. 2. For example, entries in physical log 210 may contain a physical log block identifier, actual data contents for the target block (e.g., to be written), and a logical log transaction identifier. The content of the target block may be arranged in a fixed size format (e.g., 4 Kb, 8 Kb).

Figure 3:
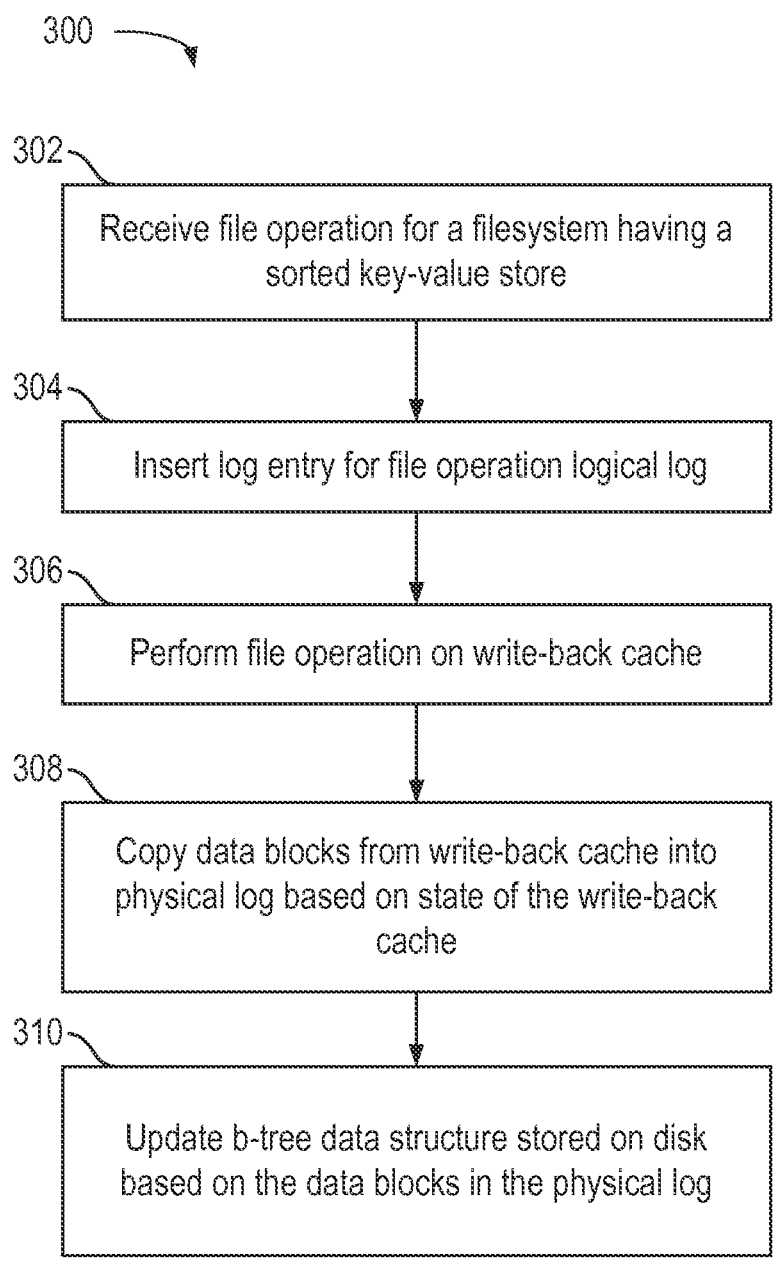
FIG. 3 is a flow diagram illustrating a method for executing transactions, according to one embodiment of the present disclosure.

In one embodiment, in response to a threshold number of pages becoming "dirty" in the file system, file system 200 uses physical log 210 to write all dirty data out to disk. Page shadowing may be used to allow write-back cache 204 to continue to accept new file system client requests while the dirty pages are being synced out via physical log 210, as described in greater detail FIG. 3 is a flow diagram illustrating a method 300 for executing transactions, according to one embodiment of the present disclosure. While method 300 is described in conjunction with the systems shown in FIGS. 1 and 2, it should be recognized that other systems may be used to perform the described methods.

Method 300 begins at step 302, where a file operation is received for file system 200, the file system including a sorted, key-value store 202 comprising write-back cache 204 maintained in memory 111, a logical log 208, and a physical log 210 maintained in disk. At step 304, file system 200 inserts a log entry indicating the file operation into logical log 208.

At step 306, file system 200 performs the file operation on write-back cache 204 maintained in memory 111. In some embodiments, responsive to determining the file operation is a write operation, file system 200 generates modified blocks in write-back cache 204. In some embodiments, responsive to determining that the file operation is a read operation, file system 200 retrieves data from write-back cache 204 and not from the disk (i.e., not using B-tree data structure 206).

At step 308, file system 200 copies data blocks from write-back cache 204 into physical log 210 maintained in disk based on a state of write-back cache 204. In some embodiments, file system 200 copies data blocks from the write-back cache into the physical log maintained in disk based on a state of the write-back cache responsive to determining that the write-back cache has exceeded a threshold amount of modified blocks. At step 310, file system updates B-tree data structure 206 stored on the disk based on the data blocks in physical log 210. That is, file system 200 performs an operation that flushes changes made to data in write-back cache 204 into physical log 210, and is described in greater detail in FIG. 5. Steps 308 and 310 may be performed synchronously relative to steps 302-306, or may be performed asynchronously, i.e., at some subsequent later time not dependent on the timing of steps 302-306.

Figure 4:
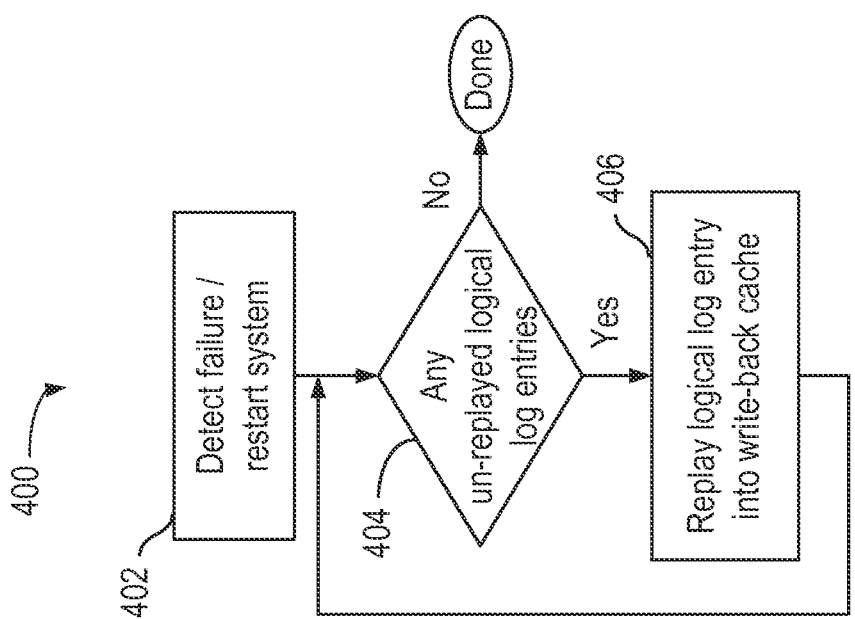
FIG. 4 is a flow diagram illustrating a method for bootstrapping a file system, according to one embodiment of the present disclosure.

There may be cases where file system 200 may suffer a failure or other interruption to its operations. As mentioned above, in such cases, file system 200 is configured to bootstrap and recover from such failures using write-back cache 204 and logical log 208. FIG. 4 is a flow diagram illustrating a method 400 for bootstrapping file system 200, according to one embodiment of the present disclosure. While method 400 is described in conjunction with the systems shown in FIGS. 1 and 2, it should be recognized that other systems may be used to perform the described methods.

Method 400 begins at step 402, where file system 200 detects a failure or a restart of the system. At step 404, file system 200 determines whether there are any un-replayed logical log entries contained in logical log 208. If so, file system 200 retrieves one or more un-replayed logical log entries from logical log 208. At step 406, file system 200 replays the logical log entries into write-back cache 204 maintained in memory 111. For example, file system 200 may retrieve an un-replayed logical log entry containing a write operation, and file system 200 executes the write operation on write-back cache 204 to modify blocks in write-back cache 204 and return write-back cache to a state having the dirty blocks prior to failure. File system 200 may continue to iteratively perform steps 404 and 406 until there are no longer any un-replayed logical log entries contained in logical log 208. In some embodiments, file system 200 performs a similar bootstrap procedure using physical log 210. In such embodiments, file system 200 retrieves one or more un-played physical log entries from the physical log, and replays the physical log entries into the write-back cache maintained in memory.

Figure 5:
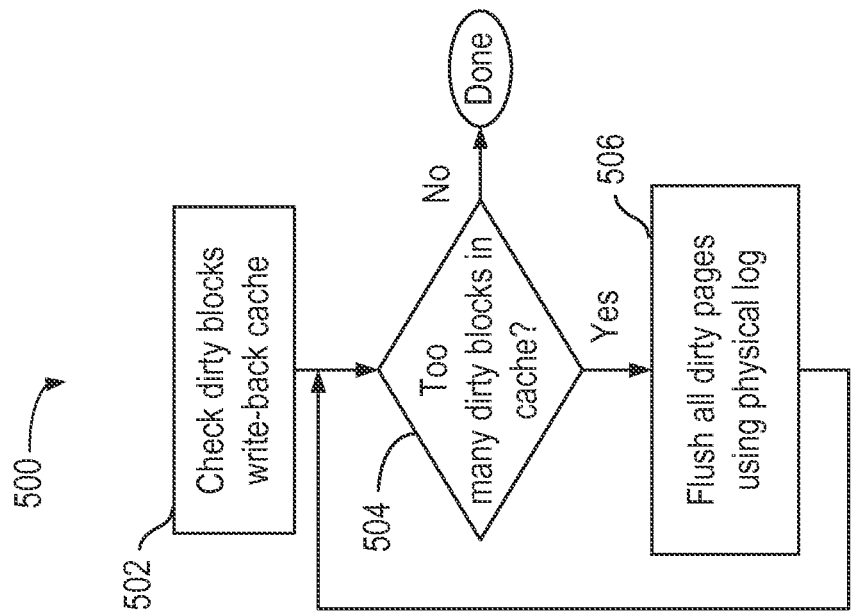
FIG. 5 is a flow diagram illustrating a method for persisting changes of a file system to disk, according to one embodiment of the present disclosure.

FIG. 5 is a flow diagram illustrating a method 500 for persisting changes of file system 200 to disk, according to one embodiment of the present disclosure. While method 500 is described in conjunction with the systems shown in FIGS. 1 and 2, it should be recognized that other systems may be used to perform the described methods.

Method 500 begins at step 502, where file system 200 checks the state of dirty blocks in write-back cache 204. In some embodiments, file system 200 may periodically check the state of write-back cache 204, or in response to a triggering event.

At step 504, file system 200 determines whether there are too many dirty blocks contained in write-back cache 204. In some embodiments, the determination may be made based on a threshold amount of modified blocks. By way of example, file system 200 may determine that changes to the write-back cache 204 needs to be flushed to the log when 25%-50% of the write-back cache contains dirty blocks, although it should be understood that the threshold value may be configurable, statically and/or dynamically assigned.

At step 506, file system 200 flushes all dirty pages in write-back cache 204 into physical log 210. In some embodiments, file system 200 may write a first physical log entry including the modified blocks to the physical log. File system 200 may then write a second physical log entry indicating a commit operation to the physical log. Responsive to writing to the second physical log entry indicating the commit operation to the physical log, file system 200 updates a data block on disk using the first physical log entry in the physical log.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, a Solid State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method, comprising:
   receiving a file operation for a file system comprising a sorted key-value store, wherein the sorted key-value store comprises a write-back cache maintained in memory, a logical log, and a physical log maintained in disk;
   inserting a log entry indicating the file operation into the logical log, the log entry comprising a value, an address in disk, and an identifier of the file operation to perform for the value at the address;
   performing the file operation on the write-back cache maintained in memory after inserting the log entry indicating the file operation into the logical log;
   copying data blocks from the write-back cache into the physical log maintained in disk based on a state of the write-back cache; and
   updating a B-tree data structure stored on the disk using the data blocks in the physical log.

2. The method of claim 1, wherein the file operation comprises a write operation, and wherein performing the file operation on the write-back cache comprises generating modified blocks in the write-back cache.

3. The method of claim 1, wherein copying data blocks from the write-back cache into the physical log maintained in disk based on a state of the write-back cache is performed responsive to determining that the write-back cache has exceeded a threshold amount of modified blocks.

4. The method of claim 1, wherein copying data blocks from the write-back cache into the physical log maintained in disk based on a state of the write-back cache further comprises:
   writing a first physical log entry comprising the modified blocks to the physical log; and
   writing a second physical log entry indicating a commit operation to the physical log.

5. The method of claim 4, further comprising:
   responsive to writing to second physical log entry indicating the commit operation to the physical log, updating a data block on disk using the first physical log entry in the physical log.

6. The method of claim 1, wherein the file operation comprises a read operation, and wherein performing the file operation on the write-back cache comprises retrieving data from the write-back cache and not from the disk.

7. The method of claim 1, further comprising:
performing a bootstrap procedure subsequent to a system failure, the bootstrap procedure comprising:
retrieving one or more un-played physical log entries from the physical log;
replaying the physical log entries into the write-back cache maintained in memory;
retrieving one or more un-replayed logical log entries from the logical log; and
replaying the logical log entries into the write-back cache maintained in memory.

8. A non-transitory computer-readable storage medium comprising instructions that, when executed in a computing device, perform the steps of:
receiving a file operation for a file system comprising a sorted key-value store, wherein the sorted key-value store comprises a write-back cache maintained in memory, a logical log, and a physical log maintained in disk;
inserting a log entry indicating the file operation into the logical log, the log entry comprising a value, an address in disk, and an identifier of the file operation to perform for the value at the address;
performing the file operation on the write-back cache maintained in memory after inserting the log entry indicating the file operation into the logical log;
copying data blocks from the write-back cache into the physical log maintained in disk based on a state of the write-back cache; and
updating a B-tree data structure stored on the disk using the data blocks in the physical log.

9. The non-transitory computer-readable storage medium of claim 8, wherein the file operation comprises a write operation, and wherein performing the file operation on the write-back cache comprises generating modified blocks in the write-back cache.

10. The non-transitory computer-readable storage medium of claim 8, wherein copying data blocks from the write-back cache into the physical log maintained in disk based on a state of the write-back cache is performed responsive to determining that the write-back cache has exceeded a threshold amount of modified blocks.

11. The non-transitory computer-readable storage medium of claim 8, wherein copying data blocks from the write-back cache into the physical log maintained in disk based on a state of the write-back cache further comprises:
writing a first physical log entry comprising the modified blocks to the physical log; and
writing a second physical log entry indicating a commit operation to the physical log.

12. The non-transitory computer-readable storage medium of claim 11, wherein the steps further comprise:
responsive to writing to second physical log entry indicating the commit operation to the physical log, updating a data block on disk using the first physical log entry in the physical log.

13. The non-transitory computer-readable storage medium of claim 8, wherein the file operation comprises a read operation, and wherein performing the file operation on the write-back cache comprises retrieving data from the write-back cache and not from the disk.

14. The non-transitory computer-readable storage medium of claim 8, wherein the steps further comprise:
performing a bootstrap procedure subsequent to a system failure, the bootstrap procedure comprising:
retrieving one or more un-replayed logical log entries from the logical log; and
replaying the logical log entries into the write-back cache maintained in memory.

15. A computer system for allocating storage space, the computer system comprising:
a storage device comprising a logical log, a physical log, and a B-tree data structure;
a memory comprising a write-back cache associated with the B-tree data structure;
a processor (CPU) configured to perform the steps of:
receiving a file operation for a file system comprising a sorted key-value store, wherein the sorted key-value store comprises the write-back cache maintained in the memory, the logical log, and the physical log maintained in the storage device;
inserting a log entry indicating the file operation into the logical log, the log entry comprising a value, an address in disk, and an identifier of the file operation to perform for the value at the address;
performing the file operation on the write-back cache maintained in memory after inserting the log entry indicating the file operation into the logical log;
copying data blocks from the write-back cache into the physical log maintained in disk based on a state of the write-back cache; and
updating a B-tree data structure stored on the disk using the data blocks in the physical log.

16. The computer system of claim 15, wherein the file operation comprises a write operation, and wherein performing the file operation on the write-back cache comprises generating modified blocks in the write-back cache; and
wherein the file operation further comprises a read operation, and wherein performing the file operation on the write-back cache comprises retrieving data from the write-back cache and not from the storage device.

17. The computer system of claim 15, wherein copying data blocks from the write-back cache into the physical log maintained in the storage device based on a state of the write-back cache is performed responsive to determining that the write-back cache has exceeded a threshold amount of modified blocks.

18. The computer system of claim 15, wherein copying data blocks from the write-back cache into the physical log maintained in the storage device based on a state of the write-back cache further comprises:
writing a first physical log entry comprising the modified blocks to the physical log; and
writing a second physical log entry indicating a commit operation to the physical log.

19. The computer system of claim 18, further comprising:
responsive to writing to second physical log entry indicating the commit operation to the physical log, updating a data block on the storage device using the first physical log entry in the physical log.

20. The computer system of claim 15, further comprising:
performing a bootstrap procedure subsequent to a system failure, the bootstrap procedure comprising:
retrieving one or more un-played physical log entries from the physical log;
replaying the physical log entries into the write-back cache maintained in memory;
retrieving one or more un-replayed logical log entries from the logical log; and
replaying the logical log entries into the write-back cache maintained in memory.

* * * * *